Nov. 30, 1971    M. A. BECKER ET AL    3,623,241
AUDIOMETER TEACHING DEVICE

Filed June 29, 1970    3 Sheets-Sheet 2

3,623,241
AUDIOMETER TEACHING DEVICE
Marshall A. Becker, 1007 Crest Park Drive, Silver Spring, Md. 20903; John S. Horner, 2400 Barracks Road, Charlottesville, Va. 22901; and Edward S. Stein, 5717 Nevada Ave. NW., Washington, D.C. 20015
Filed June 29, 1970, Ser. No. 50,403
(Filed under Rule 47(a) and 35 U.S.C. 116)
Int. Cl. G09b 25/02
U.S. Cl. 35—13
17 Claims

ABSTRACT OF THE DISCLOSURE

In a device for training personnel to utilize audiometers, instructor programmed settings of potentiometers simulate the amplitude versus frequency hearing threshold response of a simulated subject. The responses for different frequencies are selectively fed through a switch controlled by a trainee to provide variable amplitude signals representing simulated air and bone conduction responses for both ears. Different combinations of these responses are selectively fed through a second switch controlled by the trainee to simulate different test modes. The responses of the second selector switch are fed to an electronic network having trainee responsive inputs indicative of simulated tone amplitudes and noise masking effects fed to the simulated subject. The electronic circuit is selectively responsive to an instructor-induced variable amplitude signal simulating response inconsistency of simulated subjects. These signals are combined to derive a binary signal actuating a gate feeding a lamp indicator. The gate is also responsive to a trainee actuated switch for simulating the application of a tone by the audiometer to the simulated subject. The gate and switch circuitry prevent the trainee from sweeping the frequency and amplitude response selectors.

---

The present invention relates generally to teaching devices and, more particularly, to a device for teaching trainees to utilize audiometers.

To test the hearing capabilities of subjects, modern audiometers generally include separate controls for selectively feeding tones of different frequencies at variable amplitudes to the subject. The tones are selectively fed to the different ears of the subject, with provision being made for acoustical coupling through bone and air conduction. There may be a tendency in pathological cases for tones fed directly to a bad ear being tested (a test ear) to be coupled acoustically to a good ear not being tested (a non-test ear) with sufficient magnitude to be heard in the non-test ear. This effect is generally referred to as either lateralization or shadow effect. To overcome the shadow effect and enable only one ear at a time to be tested, the technique generally involves feeding noise into the non-test ear. The noise provides a masking effect into the non-test ear to keep that ear busy, while the tested ear is responsive to a pure tone of predetermined amplitude and frequency. Since the subject is instructed to distinguish tones from noise, the response of the tested ear can usually be ascertained accurately.

A problem, however, sometimes arises because, in pathological cases, noise being fed into a good non-test ear can be fed through bone and air conduction to a bad tested ear. The noise fed from the good non-test ear to a bad tested ear can overcome the effects of the tone fed to the bad, tested ear. Such an effect is termed overmasking. For most subjects with one good ear and one bad ear there is a relatively small plateau between the threshold point where a bad, tested ear will be responsive to a tone and the point where overmasking from the noise introduced into the good, non-test ear overrides the tone sensed by the bad, test ear. When tones are coupled to the tested ear by the bone conduction mechanism, there is an interaural attenuation of the tone as it propagates from the test ear to the non-test ear. The attenuation is between 0 db and 10 db depending upon the frequency of the tone. In contrast, when an ear is being tested for air conduction properties, there is a frequency dependent interaural attenuation of between 35 and 60 db in coupling tones from a test ear to a non-test ear.

To teach completely the use of an audiometer to a neophyte, it is desirable to simulate these various effects. The present invention provides a device for simulating many different types of pathological conditions which might be experienced by personnel trained in the use of audiometers. The invention obviates the need to train with actual human subjects, as has generally been the technique in the past.

Training with actual human subjects has been found frequently to be of little benefit because the subjects often are acquaintances of the trainee, and thereby have relatively normal hearing to prevent the trainee from having the opportunity to use the audiometer in pathological situations. A trainee thereby is provided with little if any opportunity to test actual pathological situations concerned with shadow curves, masking, overmasking and inconsistent or unreliable responses. Instructors often have no knowledge concerning the ability of students to utilize the audiometer correctly because frequently they have no information regarding the hearing capabilities of tested subjects. In fact, it has been found that in certain instances tests allegedly made by trainees have not been conducted at all. While simulators for training personnel in the use of audiometers have been developed, they usually have been experimental, one-of-a-kind units that are bulky, complex to operate or impractical for everyday use.

In accordance with the present invention, there is provided a practical, commercial device for training students to use an audiometer. The apparatus includes a student or trainee station having dials simulating the amplitude and frequency selection controls for tones fed by an audiometer to a simulated subject. In addition, dials are provided to selectively control the amplitude of masking for a non-test ear, as well as for selecting programmed characteristics indicative of air and bone conduction for the two ears.

To enable an instructor to program simulated air and bone conduction hearing threshold responses for both ears, four different channels or banks of potentiometers for deriving variable amplitude D.C. signals are provided. Each potentiometer channel simulates the programmed amplitude versus frequency response of a simulated subject for one of the ears and one of the types of conduction and is topologically arranged in the same manner as an audiograph, a plot of hearing loss amplitude as a function of frequency, frequently referred to in the art as an audiogram. To this end, taps of the potentiometers are physically coupled to linearly translated handles having vertical positions simulating amplitudes on an audiograph. The different potentiometer handles in each bank slide in different vertically extending slots displaced from each other to simulate different frequency positions of an audiograph. This particular arrangement enables a very large number of pathological situations to be considered, yet is simple to program because of the instructor's familiarity with audiographs.

In response to the trainee adjusting the frequency selector dial, the position of a first switch is adjusted to feed D.C. voltages simulating the simulated subject hearing threshold for the frequency selected by the student from one of the potentiometers in each of the four potentiometer channels to a second selector switch. The setting of the second selector switch is controlled by the trainee positioning the dial controlling the ear to be tested and the type of conduction being simulated. The second selector switch feeds different combinations of a plurality of signals having amplitudes dependent upon the programmed air and bone conduction settings for the two ears being simulated to an electronic logic type circuit. The logic type circuit responds to the signals and trainee-induced variable amplitude signals indicative of the simulated tone amplitude fed to the simulated subject, as well as the amplitude of masking into the simulated, non-test ear. The logic type circuit or network compares the relative amplitudes of the signals fed thereto derive a signal for enabling an indicator lamp to be actuated. The enabling signal includes the simulated effects of masking and overmasking. To simulate the air conduction interaural attenuation of between 35 and 60 db for different actual subjects a 45 db level shift for air conduction is induced, while bone conduction interaural attenuation of between 0 and 10 db is simulated by a 5 db level shift. To simulate overmasking a 45 db level shift is also inserted since masking noise is usually introduced by the air conduction mechanism. The stated fixed level shifts are introduced as a matter of convenience; it is to be understood that other fixed level shifts can be introduced or that the level shift can be made frequency dependent. The indicator lamp is actuated in response to the enabling signal and a trainee energizing a tone bar simulating coupling of the trainee selected amplitude and frequency tone to a simulated subject.

A network responsive to the tone bar prevents the trainee from sweeping the hearing loss and frequency selector dials at will, i.e., the trainee cannot keep his finger on the response button and turn the amplitude dial until the lamp is energized or deenergized. To this end, the network associated with the tone bar includes a delay element and a latching network, whereby the bar must be depressed for a predetermined time period prior to the lamp being actuated. Once the tone bar has been actuated, the network for energizing the indicator lamp remains latched either into the energized or denergized state. Since the bar must be depressed for a predetermined time period, controlled by the delay element, the trainee cannot quickly energize it but must keep the bar depressed for a time period simulating the response time of a subject to audiometer testing.

A further operational feature of the present invention concerns the capability of effectively simulating the inconsistent response of a simulated subject in the vicinity of the hearing threshold. It has been found in many cases that subjects do not always respond in a consistent manner to tones in the vicinity of the hearing threshold. Sometimes subjects indicate that a tone has been heard when none, in fact, has been provided. At other times a subject will hear and fail to hear tones having the same amplitude and frequency even though the tones are supplied to him in a relatively short time span. This inconsistent, random response is different for different subjects but generally there is a tendency to be inconsistent around rather than above the threshold.

The present invention provides a relatively simple apparatus for simulating the random inconsistency response. The inconsistent feature becomes operational when the simulated threshold response and tone amplitude are approximately equal and is added at will by the instructor, who has the ability to select one of plural inconsistency levels. It is attained in a facile manner by supplying a 120 hertz rectangular wave voltage of variable duty cycle, dependent on the selected inconsistency level and the relative amplitudes of the simulated threshold response and tone amplitude, to the gate energizing the actuator. The variable duty cycle voltage is combined with a relatively short duration pulse derived from the network responsive to the tone bar. Since the tone bar is actuated at random time by the trainee, the variable duty cycle voltage is combined with the pulse to randomly energize the gating circuit and the lamp connected thereto and simulate inconsistent simulated subject response in the vicinity of the hearing threshold.

A further feature of the invention is that the threshold response of the simulated subject can be programmed within the same cabinet as the simulated audiometer or from an external location feeding a plurality of simulated audiometers. In units wherein the programming elements are integral with the audiometer simulating apparatus, the programmed, simulated threshold handles are positioned beneath a false cover selectively locked in situ by the instructor. Thereby, the trainee cannot be apprised of the program.

It is, accordingly, an object of the present invention to provide a new and improved device for training students in the use of audiometers.

Another object of the present invention is to provide a new and improved device for training students to utilize audiometers having an instructor programmed hearing loss versus frequency response for a simulated subject, with each frequency for each simulated ear independently programmable for air and bone conduction.

Another object of the present invention is to provide a new and improved system for training students to use audiometers wherein simulated normal interaural relationships are provided to attain lateralized responses.

Still another object of the present invention is to provide a new and improved device for training personnel to utilize audiometers wherein provisions is made for masking effects of noise, as well as to provide for overmasking between the ears.

Still another object of the invention is to provide a new and improved device for training students in the use of audiometers wherein an instructor can preprogram the device with a multiplicity of combinations in a facile manner simulating the amplitude versus frequency response of an audiograph.

Still another object of the present invention is to provide a new and improved device for training students to utilize audiometers wherein random effects of a subject in detecting a threshold value are effectively simulated.

The above and still further objects, features and advantages of the present invention will become apparent upon consideration of the following detailed description of one specific embodiment thereof, especially when taken in conjunction with the accompanying drawings, wherein:

FIG. 1a is a side sectional view of a handle detented rod used in a programmer station of the trainer illustrated by FIG. 1;

Figure 1:
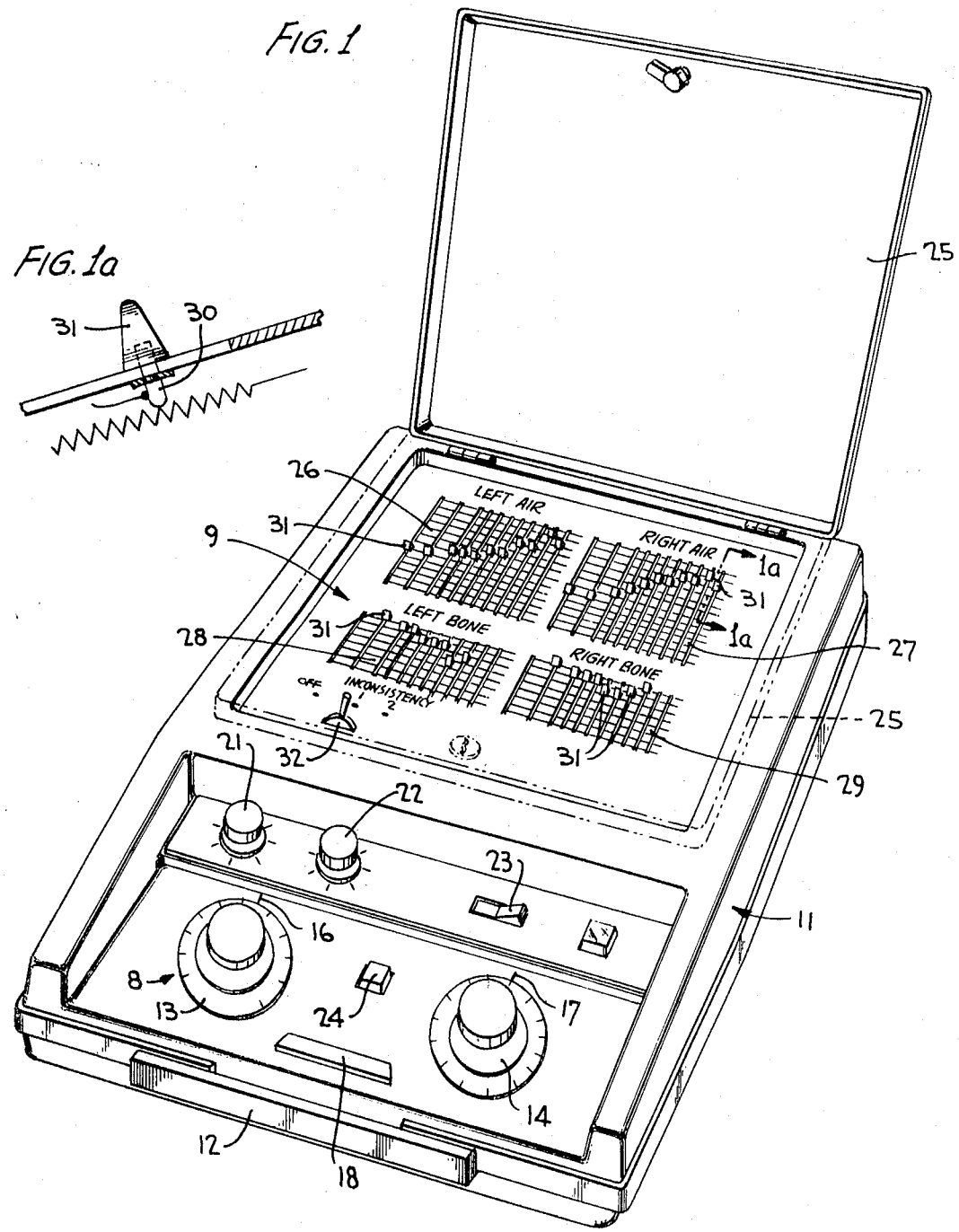
FIG. 1 is a perspective view of an audiometric trainer in accordance with a preferred embodiment of the invention.

Reference is now made specifically to FIG. 1 of the drawings wherein there is illustrated a preferred embodiment of the combined student station 8 and programmer 9 of the present invention. Programmer 9 and student station 8 are contained in a housing 11, provided with a suitable covering lid and a carrying handle 12 at one end. Student station 8 simulating the layout of an actual audiometer includes a pair of rotary control dials 13 and 14 disposed towards the front edge of casing 11 and on the left and right-hand sides thereof On each of control dials 13 and 14 and integral therewith are rotary scales simulating hearing loss characteristics, in db, and frequency, in hertz. Left-hand dial 13, simulating the amplitude of a tone applied to a simulated subject, is scaled from zero to 110 db, while the scale on dial 14 includes an off position and a frequency setting running the gamut from 125 hertz through 8,000 hertz. Dials 13 and 14 are rotated by the student so that indicia on the scales are aligned with fixedly positioned hairlines 16 and 17 on the surface of casing 11.

Between dials 13 and 14 a tone bar 18 is provided. Bar 18 is depressed by the trainee to simulate coupling of an acoustic tone to the simulated subject at the amplitude and frequencies determined by the settings of dials 13 and 14. Bar 18 must be depressed for at least a predetermined time period to simulate accurately the response time of an actual subject. Above bar 18 is plastic window 24 for enabling an on-off indication of the simulated student response to be obtained through energization of a lamp (not shown) beneath the window.

Above dials 13 and 14 and tone bar 18 and within trainee station 8 are located masking and output rotary dials 21 and 22, as well as power toggle type switch 23. Associated with masking dial 21 is a scale varying from off or zero db to 80 db to simulate a masking condition varying between zero and 80 db. Thereby, the trainee can simulate coupling of noise from zero to 80 db to a non-test ear.

Control dial 22 is detented to four different positions, respectively associated with simulating air conduction in the left and right ears, and bone conduction in the left and right ears and is therefore considered as a mode selector. The trainee positions dial 22 at one of the four positions to feed different combinations of simulated subject amplitude versus frequency threshold hearing responses programmed into the device by an instructor to electronic circuitry described infra.

In a unit wherein the simulated response is programmed in the same unit employed for carrying the simulated audiometer, the program is located beneath lockable cover plate 25, covering programmer 9 in the half of casing 11 above trainee station 8. Programmer 9 includes four different channels 26–29 for simulating the threshold hearing responses of a simulated subject, for both ears and both air and bone conduction. Channels 26 and 27 are provided for simulating air conduction in the left and right ears, respectively, while channels 28 and 29 simulate bone conduction in the left and right ears.

Figure 3:
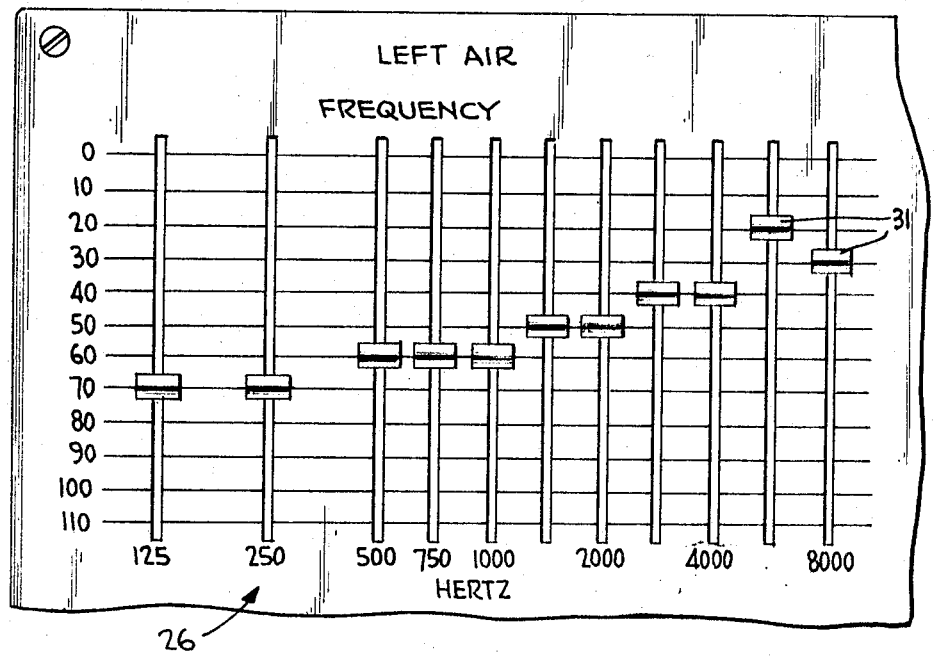
FIG. 3 is a plan view of a programmable selector switch utilized in the trainer.

Each of channels 26–29 is arranged in a manner topologically simulating the characteristics of an audiogram, as seen in FIG. 3 wherein channel 26 is illustrated with particularity. The amplitude of programmed simulated hearing threshold level, in db, is a series of horizontally extending, parallel lines, while different frequency responses are indicated by a series of parallel vertically extending slots that appear as lines to the observer. The horizontal lines for channels 26 and 27, simulating air conduction for the left and right ears, include a set of vertically extending indicia with values at 10 db increments between zero and 110 db, while the horizontal lines for channels 28 and 29, simulating left and right bone conduction, include a set of vertically extending 10 db incremental indicia with values from zero through 70 db. The frequencies tested for air conduction in channels 26 and 27 are the standard frequencies of 125 hertz, 250 hertz, 500 hertz, 750 hertz, 1,000 hertz, 1,500 hertz, 2,000 hertz, 3,000 hertz, 4,000 hertz, 6,000 hertz, and 8,000 hertz, indicated by horizontally extending sets of indicia at the bottom of the different slots, whereby the frequency and amplitude indicia are at right angles to each other In the bone conduction channels 28 and 29 the only frequencies simulated are from 250–4,000 hertz in the same gamut of frequencies as is simulated by channels 26 and 27. The extremely low 125 hertz and extremely high 6,000 and 8,000 hertz responses are not simulated in the bone conduction channels because of the inabilities of the actual testing equipment adequately to reproduce these frequencies in the bone conduction testing mode.

Extending through each of the slots is a detented rod 30 having a dielectric, manually adjustable handle 31 fixedly mounted at its end. The positions of rods 30 and handle 31 are adjusted through a detented mechanism by the instructor to simulate the threshold hearing characteristics of a simulated student. Rods 30 are detented so that handles 31 can be incrementally positioned at distances along the slots corresponding with 5 db hearing losses. The position of each handle 31 determines the amplitude of a D.C. voltage fed from a matrix associated with each channel 26–29 to a selector switch array controlled by the position of dial 14.

For advanced training, inconsistency response of a simulated trainee is selectively introduced by three-position switch 32, located beneath lockable cover plate 25. Switch 32 can be energized by the instructor to either an off position, or to selectively provide for two inconsistency situations; in one inconsistency situation a relatively large inconsistency swing is provided between approximately $-10$ and $+10$ db relative to the threshold point established by programmable channels 26–29 and in the second position there is introduced a smaller degree of inconsistency, from approximately $-5$ to $+5$ db relative to threshold value programmed into channels 26–29.

In use, cover plate 25 is locked in situ and the student adjusts hearing loss and frequency dials 13 and 14 to a particular position after having adjusted dial 22 to simulate coupling of tones into either ear by bone or air conduction. Student adjusts the position of dial 21 to simulate the masking effects of noise on the non-test ear. By positioning dial 14, the voltages associated with the selected frequency of channels 26–29 are fed through a first switching network to a second switching network responsive to the position of dial 22. The amplitudes of voltages fed through the first and second switching networks are compared in electronic circuitry, described infra, with voltages controlled by the settings of dials 13 and 21 to enable actuation of a drive circuit for the lamp beneath window 24. The electronic circuitry responds to signals coupled through the first and second switches and the amplitude of the masking voltage to derive threshold level signals for comparison with the amplitude of the simulated tone applied to the simulated subject, as determined by the setting of dial 13, in accordance with Table I, page 15.

To interpret Table I, $\theta$ is indicative of a threshold value; $\theta_t$ is indicative of a threshold value determined by the amplitude setting in one of channels 26–29 for the frequency selected by dial 14 for the ear being tested, as selected by dial 22; $\theta_n$ is indicative of the threshold for a non-test ear for the frequency selected by dial 14; the subscripts $a$ and $b$ associated with $\theta$ indicate air and bone conduction, respectively; and $\theta_m$ is commensurate with the amplitude of masking effect noise simulated by the position of dial 21. In interpreting Table I and throughout the remainder of the present specification plus signs associated with db indicate a shift in hearing level away from zero db hearing loss (no hearing loss), while minus signs indicate the opposite condition.

To provide an indication as to how Table I is to be interpreted, consider the situation wherein the test ear being simulated is to be tested for air conduction at a particular frequency, the situation of the first and second lines of the table. The simulated threshrold, $\theta_{at}$, at the selected frequency is added to a voltage level indicative of $-45$ db and the resultant sum is compared with the bone conduction threshold for the non-test ear, $\theta_{bn}$. In response to $(\theta_{at} -45$ db$)$ being less than $\theta_{bn}$, masking has no effect on the threshold and the threshold for comparison with the setting of dial 13 is the value of $\theta_{at}$, assuming no consideration is given to overmasking. This situation of no masking or overmasking is indicated in the first line of the table. In response, however, to $(\theta_{at} -45$ db$)$ being greater than $\theta_{bn}$, masking becomes effective at the threshold value for air conduction of the non-test ear, $\theta_{an}$. Under these circumstances, with the non-test ear unmasked the threshold is set at $(\theta_{bn} +45$ db$)$. This is the situation indicated by the second line of the table. The logic for the remainder of the table is easily deduced from the foregoing description for the first and second lines and will become more evident infra when the logic circuitry for carrying out the operations is described.

position of dial 14. The contactors 52–55 are ganged with each other in such a manner as to enable the voltages on all of the contactors to be associated with the programmed threshold value of channels 26–29 for the same frequ-

TABLE I

|  | | Masking effective | Comparison condition | Masking becomes effective at— | Threshold with non-test ear unmasked | Final threshold level |
|---|---|---|---|---|---|---|
| Air-test ear | No | $\theta_{at}-45$ db$<\theta_{bn}$ | | $\theta_{at}$ | $\theta_{at}$. |
| | Yes | $\theta_{at}-45$ db$>\theta_{bn}$ | $\theta_{an}$ | $\theta_{bn}+45$ db | $\theta_{at}$. |
| Bone-test ear | No | $\theta_{bt}-5$ db$<\theta_{bn}$ | | $\theta_{bt}$ | $\theta_{bt}$. |
| | Yes | $\theta_{bt}-5$ db$>\theta_{bn}$ | $\theta_{an}$ | $\theta_{bn}$ | $\theta_{bt}$. |
| Overmasking-air | No | | | | Limit of audiometer masking control. |
| | Yes | $\theta_m-45$ db$>\theta_{bt}$ | | $\theta_{at}$ | |
| Overmasking-bone | No | | | | Limit of masking control on audiometer. |
| | Yes | $\theta_m-45$ db$>\theta_{bt}$ | | $\theta_{bt}$ | |

Figure 2:
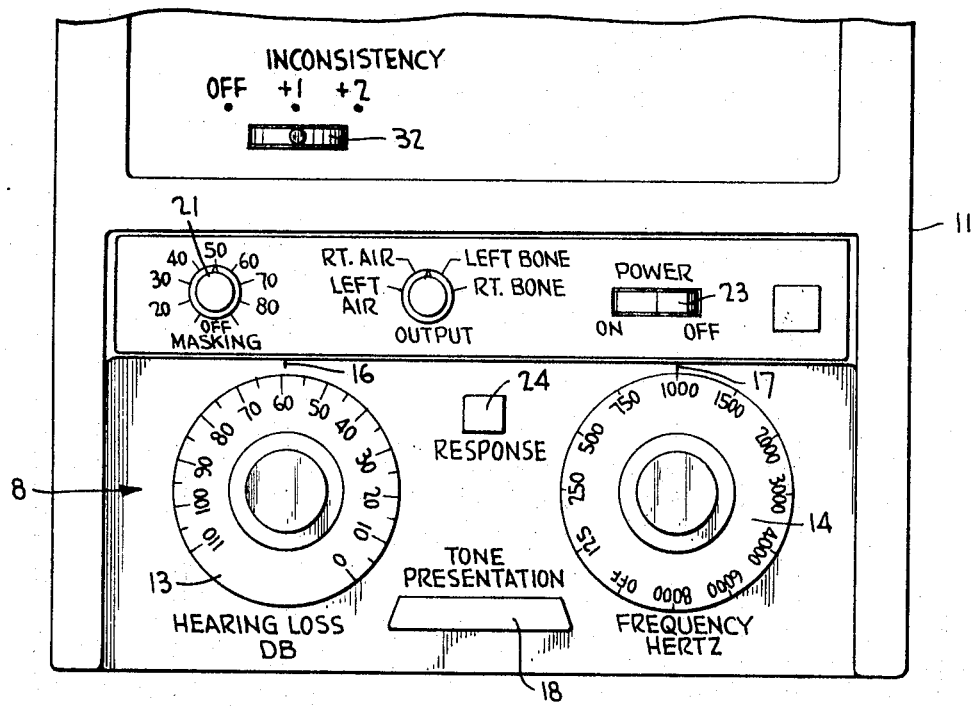
FIG. 2 is a plan view of the trainer of FIG. 1.
Figure 4:
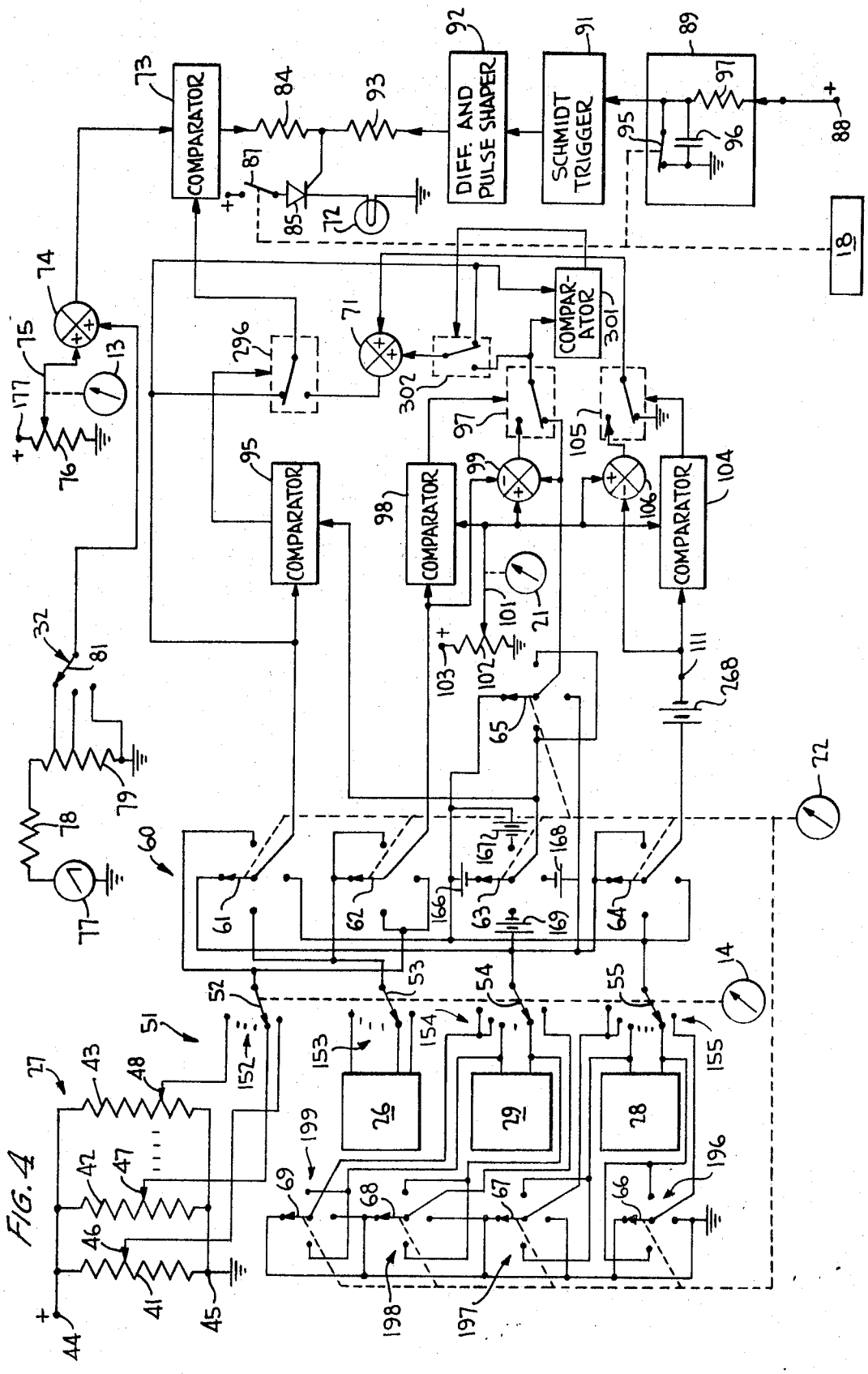
FIG. 4 is a block diagram of the circuitry included in the trainer.

The electronic circuitry for performing the logic operations outlined by Table I and associated with the various dials and actuators of FIGS. 1–3 is illustrated in FIG. 4. In FIG. 4, four banks of potentiometers, one for each of channels 26–29, is provided. A portion of the circuitry for the potentiometer bank of channel 27 is illustrated and the structure included in the remaining potentiometer banks associated with channels 26, 28 and 29 is believed evident from the description of the bank for channel 27.

In the bank for channel 27, eleven potentiometers are provided, three of which are illustrated. Potentiometers 41–43 of channel 27 are excited in parallel by a positive D.C. voltage source connected between terminal 44 and ground 45. Each of potentiometers 41–43 includes 23 taps selectively connected to sliders 46, 47 and 48, respectively. The positions of the sliders are determined by the instructor setting handles 31 carrying detented rods 30, a different one of which is connected to a different slider. Each of the potentiometers in channel 27 simulates the programmed threshold air conduction response at a different frequency of the right ear of the simulated subject. The position of the potentiometer sliders is indicative of the threshold amplitude, whereby the threshold amplitudes vary from voltages corresponding with zero to 110 db hearing loss for the frequencies in the gamut from 125 through 8,000 hertz; a zero level hearing loss corresponds with the power supply voltage applied to terminal 44, while a complete hearing loss is commensurate with ground potential. Therefore, the positive voltage level corresponds with a zero db level hearing loss, while decreasing voltages are commensurate with greater hearing losses. Potentiometer sliders in channel 26 are controlled by handles 31, as indicated supra, in exactly the same manner as the sliders for channel 27. In channels 28 and 29, however, only eight potentiometers are provided, and each potentiometer has only fifteen taps thereby providing for the lower amplitude and frequency spread associated with bone conduction testing. While multiple potentiometers are illustrated in each of channels 26–29, it is to be understood that a single potentiometer and a matrix of switches can be employed in each channel. The switch matrices would be topologically arranged in the same form as illustrated for the potentiometer sliders.

The voltages on the sliders of the potentiometers in channels 26–29 are fed to the terminals of four deck switching matrix 51. In each of the four decks 152–155 of the switching matrix, eleven terminals are provided, with the terminals of the decks responsive to the signals of channels 26 and 27 connected to a different slider in channels 26 and 27. The decks responsive to the signals of channels 28 and 29 are connected to the sliders of potentiometers therein, with the exception of the terminals for the lowest frequency and two highest frequency positions.

The four decks of switch matrix 51 are respectively provided with a different one of contactors 52–55, which are ganged together and rotated under control of the ency. Thereby, the voltages on contactors 52–55 at any time are indicative of the simulated threshold for right ear air conduction, left ear air conduction, right ear bone conduction and left ear bone conduction for the frequency selected by dial 14.

The voltages derived from contactors 52–55 of switching matrix 51 are fed to a second switching matrix 60 having nine decks, each including a separate rotary conductor 61–69. Contactors 61–69 are ganged together and rotated in response to the trainee turning detented dial 22 to select the simulated mode of operation for either ear and both types of conduction and feed different combinations of the signals on contactors 52–55 to the electronic logic network described infra. To this end, each of the decks includes four terminals wired to contactors 52–55 so that generally: the voltage derived from contactor 61 is indicative of the threshold amplitude of the simulated tested ear, whether the ear is being tested for air or bone conduction; the voltage derived from contactor 62 is commensurate with the air conduction threshold for the non-test ear; the voltage derived from contactor 63 is indicative of the bone conduction threshold for the non-test ear modified by the proper interaural attenuation fatcor and used to determine when lateralization occurs; the voltage derived from contactor 64 is indicative of the bone conduction threshold for the tested ear; and the votlage derived from contactor 65 is indicative of the response level when masking is needed but is not used, as indicated by Table I, column 4.

Masking effect on the simulated non-test ear under bone conduction conditions is simulated by shifting the voltages on the terminals in the bank associated with contactor 63 by fixed, relatively small levels in a negative direction. To this end, terminals at the twelve o'clock and six o'clock positions of the deck including contactor 63 are connected in series with fixed D.C. sources 166, and 168, each having an amplitude commensurate with 5 db, the interaural attenuation factor for bone conduction. To simulate air conduction test masking, the voltages on the terminals at the three o'clock and nine o'clock positions of the deck including contractor 63 are reduced by a relatively large potential, commensurate with 45 db, the interaural attenuation factor for air conduction, by the connection of these terminals thru fixed D.C. voltage sources 167 and 169.

The positions of switches 61–69 are controlled by the setting of dial 22 so that in the illustrated twelve o'clock position of the ganged contactors the testing of right ear bone conduction is simulated. In the three and nine o'clock positions, simulated testing of right air and left air conduction are respectively provided; left bone conduction simulated testing is provided by the contactors 61–69 being in the six o'clock position, i.e., the position opposite from the illustrated position.

To provide for overmasking simulation, the voltage derived from contactor 64 is fed through fixed D.C. source 268. The voltage of source 268 is commensurate with a 45 db interaural attenuation factor resulting from masking inserted in the non-test ear lateralizing to the tested ear. Presently available audiometers are generally not capable of testing bone conduction for the extremely low and high frequencies in the band between 125 Hz. and 8 kHz. In consequence, the 125 Hz., 6 kHz. and 8 kHz. terminals of decks 154 and 155 are connected thru contactors 66–69 to ground so that no response is obtained at these extreme frequencies when dial 22 is set to the positions corresponding with bone conduction testing of the left and right ears. (In FIG. 4, the 125 Hz., 250 Hz., 4 kHz., 6 kHz. and 8 kHz. terminals of decks 154 and 155 are respectively illustrated as terminals extending from the bottom through the top of each deck.) To simulate the effects of lateralization at these frequency extremes when testing by air conduction, circuitry including decks 196–199 having contactors 66–69 feeds the simulated 250 Hz. bone conduction responses of channels 28 and 29 to the 125 Hz. terminals of decks 154–155 respectively, and also feeds the simulated 4 kHz. bone conduction responses of channels 28 and 29 to the 6 kHz. and 8 kHz. terminals of decks 155 and 154 respectively. To these ends, the 125 Hz. terminals of decks 155 and 154 are respectively fed to contactors 66 and 68, the 6 kHz. and 8 kHz. terminals of each of decks 155 and 154 are strapped together and are connected to contactors 67 and 69 respectively. All terminals of decks 196–199 in the six o'clock and twelve o'clock positions are connected to ground. The 250 Hz. output terminal of channel 28 is connected in the three o'clock and nine o'clock positions of deck 196. The 250 Hz. output terminal of channel 29 is connected in the three o'clock and nine o'clock positions of deck 198. The 8 kHz. and 6 kHz. output terminals of channel 28 are strapped together and connected in the three o'clock and nine o'clock positions of deck 197. The 8 kHz. and 6 kHz. output terminals of channel 29 are strapped together and connected in the three o'clock and nine o'clock positions of deck 199.

In operation, with dial 22 set to simulate bone conduction testing for either ear, i.e., with contactors 61–69 at the twelve or six o'clock positions, while dial 14 is set at any of the 125 Hz., 6 kHz. or 8 kHz. frequencies, ground potential will be fed from contactors 66–69 to contactors 54 and 55. The ground potential on contactor 54 and 55 is fed through the decks including contactors to circuitry selectively driving an indicator. The ground potential prevents activation of the indicator regardless of the setting of dial 13 or dial 21 so that the student can be trained not to test for bone conduction at the frequency extremes of 125 Hz., 6 kHz. and 8 kHz. For air conduction testing, while contactors 61–69 are in the nine o'clock or twelve o'clock position and dial 14 is set at one of the frequency extremes, the voltages at contactors 54 and 55 are commensurate with the nearest intermediate frequency responses.

The threshold value for the selected frequency and mode, as derived from contactor 61, is fed to one terminal of two state electronic switches 296, which forms a portion of the electronic logic or comparison network. For the simplest situation, which will now be described, the sole voltage derived from the output of switch 296 is equal to the output voltage or contactor 61. The output voltage of switch 296 is fed to circuitry for enabling activation of lamp 72, positioned beneath window 24.

The circuitry for selectively actuating lamp 72 includes comparator 73, responsive to the D.C. output voltage of switch 296, as well as the D.C. output voltage of summing circuit 74. One input of summing circuit 74 is responsive to the positive, D.C. voltage derived from slider 75 of potentiometer 76, energized by a positive, D.C. voltage connected between terminal 177 and ground. The position of slider 75 is controlled by the trainee turning dial 13 to simulate the amplitude level of the simulated tone being applied to the simulated subject.

The level of the voltage derived from slider 75 is selectively varied by a relatively small amount to simulate inconsistency. To this end, another input to summing circuit 74 is selectively responsive to a relatively low amplitude constantly time varying 120 Hz. relatively linear saw tooth voltage source 77, such as derived from a full wave rectified and filtered 60 hertz line voltage source. Source 77, having equal amplitude positive and negative excursions about a zero voltage level, is connected through dropping resistor 78 to potentiometer 79 having three taps selectively connected to slider 81. The taps on potentiometer 79 enable the peak, positive voltage fed to slider 81 to be of zero level, a relatively small level commensurate with ±5 db hearing loss, or a larger level simulating a ±10 db hearing loss. The position of slider 81 is controlled by the instructor actuating three position switch 32, so that when the slider is in engagement with the grounded contact of potentiometer 79 the switch is in the inconsistency off position, while the slider engaging either of the other taps of the potentiometer is commensurate with the low and high inconsistency levels.

From the foregoing, the voltage derived from summing circuit 74 is a D.C. voltage having an amplitude commensurate with the simulated trainee induced tone amplitude setting of potentiometer 75. The D.C. voltage is varied in amplitude at 120 hertz at a level depending upon the setting of switch contactor 81.

Comparator 73 responds to the analog voltages derived from the outputs of summing network and switch 296. In response to the output voltage of network 74 being less than the voltage derived from switch 296, comparator 73 derives a fixed level, positive voltage, while a zero amplitude voltage is derived from the comparator in response to the level of the voltage derived from switch 296 being less than the output voltage of network 74.

The voltage derived from comparator 73 is applied through resistor 84 to the gate electrode of silicon controlled rectifier SCR 85. The positive voltage applied by comparator 73 through resistor 84 to the gate of SCR 85 is insufficient, by itself, to trigger the SCR into another cathode conduction. To trigger the gate circuit of SCR 85 into conduction simultaneously with a positive voltage being derived by comparator 73, bar 18 must be depressed for a predetermined time period simultating the response time of a subject to a tone.

To sense whether bar 18 has been depressed for the predetermined time period and derive a positive, short duration, predetermined amplitude pulse in response thereto, the bar is mechanically coupled to switches 87 and 95. Switch 87 is normally open and is closed in response to the bar being depressed, while switch 95 is normally closed and is open in response to the bar being activated. In response to bar 18 being depressed, a positive, D.C. voltage source connected to terminal 88 charges capacitor 96 of integrator 89 that includes also resistor 97 and contact 95. Capacitor 96 is normally shunted by contact 95, mechanically coupled to bar 18, so that the contact is open circuited in response to the bar being depressed. In response to the positive voltage at terminal 88 being coupled to the integrator through switch 95 for the predetermined time interval, the output voltage of integrator 89 exceeds a predetermined amplitude. To sense whether this amplitude has been exceeded Schmidt trigger 95, having an input response to the integrator output, is provided. In response to the integrator 89 output exceeding the Schmidt trigger 91 threshold level, the Schmidt trigger derives a relatively high level output voltage. The Schmidt trigger output voltage remains at the relatively high level until the output of integrator 89 decreases below the trigger threshold level when bar 18 is released and capacitor 96 is discharged by contact 95. The positive going output voltage of Schmidt trigger 91 is converted by differentiating and pulse shaping network 92 into a positive relatively narrow, predetermined amplitude pulse having a width much less than the period of one cycle of source 77, e.g., on the order of one millisecond.

The output pulse of differentiator and pulse shaper 92 is fed via decoupling resistor 93 to the gate electrode of SCR 85. The amplitude of the voltage fed by differentiator and pulse shaper 92 to SCR 85 is insufficient, by itself, to cause the SCR to trigger into a conducting state. The combined positive voltages applied to the gate of SCR 85 by comparator 73 and pulse shaper 92 are, however, adequate to cause the SCR gate circuit to be triggered. In the anode cathode circuit of SCR 85 are indicator lamp 72 and normally opened contact 87, as well as a positive, D.C. power supply voltage enabling the SCR to be triggered when contact 87 is closed provided the amplitude of the voltage applied to the SCR gate is sufficient.

The particular circuit arrangement employed prevents the trainee from maintaining bar 18 in a depressed condition while sweeping the amplitude of the simulated tone applied to the simulated subject by varying the position of dial 13 and hence slider 75. This result is achieved because a single relatively narrow width pulse is applied to the gate electrode of SCR 85 each time bar 18 is depressed. If bar 18 remains depressed not more than one pulse is applied to the SCR gate electrode due to the inclusion of differentiator and pulse shaper 92. Further, the trainee is prevented from actuating bar 18 for only a short time interval, less than the response time of an actual subject in reacting to a tone, because of the delay characteristics associated with integrator 89.

The operation of the apparatus simulating inconsistency effect is now described, assuming that the D.C. voltages applied to comparator 73 simulating tone applied to the subject and subject threshold are approximately equal. When these voltages are not approximately the same, there is no inconsistency effect simulated as the simulated threshold and tone levels are displaced sufficiently to preclude inconsistent subject response. With switch 81 positioned at the ground terminal, zero voltage is always applied by slider 81 to summing network 74 and there is no inconsistency simulated. With switch 81 on the intermediate tap of slider 79, the threshold input to comparator 73 from summing network 74 simulates an inconsistent hearing loss response varying from ±5 db relative to the setting of potentiometer slider on tap 75. With switch 81 coupling the highest voltage tap of potentiometer 79 into summing network 74, the threshold level fed to comparator 73 by summing network 74 simulates an inconsistent hearing loss response varying from approimately ten db below to ten db above the setting of potentiometer slider 75. In response to the saw tooth and D.C. voltages fed to summer 74, the summer derives a 120 Hz. output having a D.C. level determined by the setting of potentiometer slider 74 and variations controlled by the setting of tap 81. The modulated D.C. output level of summer 74 is combined with the D.C. output level of switch 296 in comparator 73, which derives a variable duration 120 Hz. rectangular waveform assuming relatively equal amplitude inputs to the comparator. The duty cycle of the rectangular wave derived from comparator 73 is dependent on the relative amplitudes of the voltages applied to the comparator so that a high duty cycle occurs in response to the output of switch 296 being greater than the output of summer 74 for a majority of each saw tooth cycle, and vice versa. For a low duty cycle the comparator 73 derives a zero levl during a majority of each 120 Hz. cycle, while the comparator generates a positive voltage level during the majority of each cycle for high duty cycle operation. The variable duty cycle rectangular wave derived by comparator 73 is combined with the short duration output pulse of differentiator and pulse shaper network 92 at the gate electrode of SCR 85. The output pulse of network 92 is derived at random times, dependent upon when the operator depresses bar 18. In response to the simultaneous occurrence of the short duration pulse and the variable duty cycle wave having a positive level SCR 85 is triggered. Triggering of SCR 85 is random, dependent upon the time bar 18 is depressed and the duty cycle of the output of comparator 73.

Consideration is now given to the apparatus included within the electronic circuitry illustrated in FIG. 4 for simulating masking effects. To determine if masking is going to be a factor in the simulated response, the voltages on contactors 61 and 63 are fed to comparator 95. Comparator 95 derives a binary one output signal in response to the amplitude of the voltage on contactor 61 being less than the voltage on contactor 63, while a binary zero output is derived from the comparator in response to the opposite condition. The binary zero output level of comparator 95 activates two state electronic switch 296 to the position illustrated, whereby the voltage on contactor 61 is fed by the switch to comparator 73. In response to a binary one output of comparator 95, switch 296 is energized to feed the analog output voltage of summer 71 to the input of comparator 73.

In terms of simulated hearing conditions, comparator 95 compares the preprogrammed threshold for the selected mode, determined by the position of switch 22 and as derived on contactor 61, with a voltage indicative of the level when lateralization occurs, as derived on contactor 63. The voltage on contactor 63, when the contactor is in the six o'clock and twelve o'clock positions, is commensurate with $(\theta_{bn}+5$ db), i.e., the threshold voltage of the non-test ear, for bone conduction, minus a voltage commensurate with the simulated five db interaural attenuation factor for bone conduction lateralization. With contactor 63 in either the three or nine o'clock positions, the voltage on the contactor is commensurate with $(\theta_{bn}+45$ db), i.e., the threshold setting of the non-test ear, for bone conduction, minus a voltage commensurate with the simulated 45 db interaural attenuation factor for air conduction lateralization. Thereby, the output of comparator 95 indicates which of the masking conditions indicated by the first four rows of Table I are to be effective and controls the output of switch 296 in response to the decision.

The level at which a response occurs, assuming a binary one output of comparator 95, is determined by the output of summer 71, one terminal of which is responsive to the output of two position electronic switch 302 which in turn is connected to the output of two position electronic switch 97. Switch 302 is responsive to a binary control signal derived from comparator 301, fed by the output of switch 97 and the voltage on contactor 61. Comparator 301 responds to the inputs thereof to activate switch 302 in such a manner as to feed the highest voltage amplitude applied to the switch and comparator to one input of summer 71. In other words, if the voltage derived from switch 97 is greater than the voltage at contactor 61, the switch output voltage is supplied to summer 71, and vice versa for the opposite situation. Comparator 301 and switch 302 function to enable a masking plateau to be established, thereby precluding a continual increase in the masking level, a feature which will become evident as the description proceeds.

The normal, illustrated position of switch 97 is achieved in response to a binary zero output of comparator 98, while the switch is activated to the other condition to be responsive to the output of linear combining network 99 in response to a binary one output of comparator 98. Comparator 98 is responsive to the voltage derived from slider 101 of potentiometer 102, having terminals connected between a positive D.C. voltage at terminal 103 and ground. The position of slider 101 is determined by control dial 21 to simulate the amount of masking, $\theta_m$, introduced. The other input to comparator 98 is responsive to the voltage derived from contactor 62, hence is indicative of air conduction threshold value for the non-test ear, $\theta_{an}$. Comparator 98 responds to the values of $\theta_{an}$ and $\theta_m$ respectively derived from contactor 62 and slider 101 to derive a binary one signal in response to the voltage on contactor 62 exceeding the voltage on slider 101 and a binary zero output for the opposite condition. In the binary zero, illustrated position, the voltage selectively supplied by switch 97 to switch 302 to summer 71 is commensurate with $\theta_{bn}$ when bone conduction is being simulated, while the voltage selectively supplied by switch 97 to summer 71 is commensurate with ($\theta_{bn}$+45 db) when air conduction is being simulated. These voltages, indicative of the threshold level of the non-test ear unmasked, are derived from contactor 65 and simulate the conditions indicated by lines 2 and 4 of Table I.

In response to the masking level set by dial 21 on the slider 101 of potentiometer 102 being greater than the air threshold level of the non-test ear, as indicated by a binary one being derived from contactor 62, the output signal of switch 97 is a D.C. voltage equal to the voltage on slider 101 of masking potentiometer 102 minus a voltage indicative of the air threshold level of the non-test ear, i.e., ($\theta_m - \theta_{an}$) plus the voltage from contactor 65; in the present specification ($\theta_m - \theta_{an}$) is defined as the significant masking level. To these ends, summer 99 has a positive input terminal responsive to the voltage at the slider 101, a negative input terminal responsive to the voltage on contactor 62, and a positive input terminal responsive to the voltage on contactor 65. By feeding the output signal of combiner 99 through switches 97 and 302 to an input terminal of summing circuit 71 when masking is effective, as controlled by switch 296 being actuated in response to a binary one output of comparator 95, there is simulated the effect of adding the significant masking level in the non-test ear to the indicated air conduction threshold. This simulates the actual pathological condition of translating the indicated threshold in a direction away from zero db hearing loss by an amount equal to the significant masking in the non-test ear.

The foregoing description was made on the assumption that the output voltage of switch 97 exceeds the voltage on tap 61, a condition simulating the threshold level of the non-test ear unmasked or the significant masking level being greater than the threshold level of the tested mode of the tested ear. In response to the opposite situation occurring, whereby the threshold level of the tested mode of the tested ear exceeds the threshold level of the non-test ear unmasked or the significant masking level, comparator 301 activates switch 302 to the position illustrated to feed the threshold of the tested mode of the test ear through switch 302 to the input of summer 71. Thereby a fixed level, providing a masking plateau commensurate with the threshold level of the tested mode of the tested ear, is established.

Overmasking is simulated by comparing the D.C. voltage derived from tap 101, indicative of trainee induced simulated masking amplitude $\theta_m$, with the voltage at terminal 111 of D.C. source 268 commensurate with ($\theta_{bt}$+45 db). Comparator 104 is responsive to voltages commensurate with the values of $\theta_m$ and ($\theta_{bt}$+45 db) to derive a binary zero output when the simulated value indicative of ($\theta_{bt}$+45 db) is less than the simulated value of $\theta_m$ and a binary one output when the simulated value of $\theta_m$ is less than the simulated value of ($\theta_{bt}$+45 db). The binary output signal of comparator 104 drives switch 105 so that the switch is in the normal, illustrated position feeding ground voltage to one input of summing network 71 in response to the comparator deriving a binary zero output. In response to a binary one output of comparator 104, switch 105 is actuated to feed the output of difference network 106 to summing network 71. Difference network 106 is responsive to the $\theta_m$ and ($\theta_{bt}$+45 db) indicating signals fed to comparator 104 to derive a D.C. output signal directly proportional to $\theta_m - (\theta_{bt}+45$ db).

Comparator 104 generates a binary zero output signal in response to no overmasking being present in the simulated subject, since under these conditions the masking level in the non-test ear is less than the bone threshold of the tested ear plus 45 db. Under these circumstances there is no overmasking and the input to summing network 71 is properly zero, as derived from the grounded connection of switch 105. To simulate overmasking, wherein the masking level, $\theta_m$, in the non-test ear exceeds the bone conduction of the test ear plus 45 db, comparator 104 actuates switch 105 to feed the output of difference network 106 to summing network 71 so that the output voltage of summing network 71 is reduced by the quantity $\theta_m - (\theta_{bt}+45$ db), thus elevating the indicated threshold toward total hearing loss.

In a modification of the invention, a single instructor station can be utilized to feed simulated air and bone conduction signals for both ears to a plurality of trainee stations. In such a configuration, the housing 11 is modified so that a plurality of connectors physically replace the trainee station. Cables coupled to these connectors extend to a connector at each of the several trainee housings and override any settings that might be extant in the instructor station at the housings through a swiching arrangement responsive to insertion of the connector at the end of the cable remote from instructor station into the trainee station.

While there has been described and illustrated one specific embodiment of the invention, it will be clear that variations in the details of the embodiment specifically illustrated and described may be made without departing from the true spirit and scope of the invention as defined in the appended claims.

We claim:

1. A device for training personnel to utilize audiometers comprising an instructor station including means for deriving signals indicative of simulated hearing thresholds over a gamut of frequencies for different hearing modes of a simulated subject, said modes indicating the ear selected for testing of the simulated subject and whether the selected ear is tested for air or bone conduction, a trainee station including: means for deriving a signal simulating the amplitude of a tone fed to the simulated subject, tone selection simulating means for feeding the signals indicative of the thresholds for one of the frequencies of the gamut to a first set of terminals, mode selection simulating means for selectively coupling different combinations of the signals at the first set of terminals to a second set of terminals, first control means for simulating the application of a tone to a simulated subject; indicator means; comparison network means responsive to the signal indicative of the amplitude of the simulated tone and the signals at the second set of terminals for deriving a signal enabling the indicator means to be selectively activated; and second control means for enabling the indicator means to be activated only in response to the first control means being activated.

2. The device of claim 1 wherein said second control means includes means for enabling the indicator means to be activated only after the first control means has been activated for at least a predetermined time interval simulting the minimum response time of a subject in reacting to a tone.

3. The device of claim 2 wherein said second control means includes means for maintaining the indicator means in the same state as it is activated to in response to each activation of the first control means until the first control means is deactivated.

4. The device of claim 3 wherein said second control means includes means responsive to the first control means for deriving only one short duration pulse in response to the first control means having been activated for the predetermined time period, and latch means responsive to the pulse for maintaining the indicator activated until the first control means is deactivated.

5. The device of claim 1 wherein said instructor station includes means simulating inconsistent simulated subject threshold for deriving a signal constantly varying as a function of time, and means feeding the signal constantly varying as a function of time to the comparison network to selectively control enabling the indicator means.

6. The device of claim 5 wherein said constantly varying signal deriving means is a fixed frequency saw tooth source for varying enabling of the indicator means at the frequency of the source, and said second control means includes means for enabling the indicator means to be activated only for a time interval less than one cycle of the saw tooth in response to each activation of the first contorl means, said first control means being operated at random times by the trainee to simulate random changes in hearing threshold of a simulated subject.

7. The device of claim 1 wherein said second control means includes means for maintaining the indicator means in the same state as it is activated to in response to each activation of the first control means until the first control means is deactivated.

8. The device of claim 7 wherein said second control means includes means responsive to the first control means for deriving only one short duration pulse in response to the first control means having been activated, and latch means responsive to the pulse for maintaining the indicator activated until the first control means is deactivated.

9. The device of claim 1 wherein the means for deriving signals indicative of simulated hearing thresholds for one ear and type of hearing conduction includes a channel having a topological configuration simulating an audiograph, said channel comprising: a first set of indicia representing the gamut of frequencies and extending in a first direction, a second set of indicia representing hearing threshold levesl and extending in a second direction at right angles to the first direction, a plurality of handles translatable along mutually parallel lines running in the second direction, a different one of said parallel lines being provided for a different frequency in the gamut and each having a position corresponding with the frequency associated therewith, the position of each of said handles controlling the value of the signal for the threshold of the frequency associated therewith.

10. The device of claim 9 wherein a potentiometer means is provided for each of the frequencies, each of said potentiometer means having a different slider for a different one of the frequencies, each of said sliders being mechanically coupled to be driven by a different one of the handles.

11. The device of claim 1 wherein the trainee station further includes means simulating a variable amplitude of noise masking a nontest ear for deriving a further signal, said comparison network means including means responsive to the further signal and signals at the second set of terminals for selectively varying the signal enabling the indicator means to be selectively activated.

12. The device of claim 11 wherein the signals derived from the second set of terminals are first, second and third signals respectively indicative of: the threshold for the simulated mode selected; the air conduction threshold of the nontest ear; bone conduction threshold of the nontest ear shifted in value by first or second amounts respectively dependent upon bone or air conduction mode selection; linear combining means responsive to the first signals, means responsive to said first, second and third signals and to the further signal for feeding said third signal to said linear combining means only in response to the air conduction threshold of the nontest ear being greater than the noise masking amplitude and the shifted bone conduction threshold of the nontest ear being greater than the threshold of the selected mode, and means responsive to said first, second and third signals and the further signal for feeding the difference between the second and further signals to said linear combining mean only in response to the air conduction threshold of the nontest ear being less than the noise masking amplitude and the shifted bone conduction threshold of the nontest ear being greater than the threshold of the selected mode, and means for shifting enabling of the indicator means in response to an output signal derived from the combining means.

13. The device of claim 12 wherein a further signal is derived from the second set of terminals indicative of the bone conduction threshold of the tested ear shifted in value by a predetermined amount, and means responsive to said fourth and further signals for feeding the difference between the fourth and further signals to said combining means only in response to the noise masking amplitude being greater than the shifted bone conduction threshold.

14. The device of claim 11 further including means for setting the bone conduction simulated thresholds at frequency extremes in the gamut at a level to preclude activation of the indicator means while bone conduction testing is being simulated and for setting the bone conduction simulated thresholds at the frequency extremes in the gamut at a level to simulate masking while air conduction testing is being simulated.

15. The device of claim 14 wherein the setting means includes means for coupling the thresholds of frequencies adjacent the frequency extremes as the thresholds for the frequency extremes while air conduction testing is being simulated.

16. In a device for training personnel to utilize audiometers, an instructor station having a channel for deriving signals indicative of simulated hearing thresholds over a gamut of frequencies for a hearing mode of a simulated subject, a channel having a topological configuration simulating an audiograph, said channel comprising: a first set of indicia representing the gamut of frequencies and extending in a first direction, a second set of indicia representing hearing threshold levels and extending in a second direction at right angles to the first direction, a plurality of handles translatable along mutually parallel lines running in the second direction, a different one of said parallel lines being provided for a different frequency in the gamut and each having a position corresponding with the frequency associated therewith, the position of each of said handles controlling the value of the signal for the threshold of the frequency associated therewith.

17. The device of claim 16 wherein a potentiometer means is provided for each of the frequencies, each of said potentiometer means having a different slider for a different one of thef requencies, each of said sliders being mechanically coupled to be driven by a different one of the handles.

References Cited

UNITED STATES PATENTS

| | | | |
|---|---|---|---|
| 2,471,136 | 5/1959 | Allison | 179—1 N |
| 3,522,377 | 7/1970 | Merrill | 179—1 N |
| 3,531,595 | 9/1970 | Demarre | 179—1 N |
| 3,561,138 | 2/1971 | Catlin et al. | 35—13 |

WILLIAM H. GRIEB, Primary Examiner

U.S. Cl. X.R.

179—1 N